May 30, 1933.   J. R. CAUTLEY   1,911,430
METHOD OF MAKING BRAKE DRUMS

Filed Oct. 3, 1930

INVENTOR
JOHN R. CAUTLEY
BY
M. W. McConkey
ATTORNEY

Patented May 30, 1933

1,911,430

UNITED STATES PATENT OFFICE

JOHN R. CAUTLEY, OF SOUTH BEND, INDIANA, ASSIGNOR TO BENDIX BRAKE COMPANY, OF SOUTH BEND, INDIANA, A CORPORATION OF ILLINOIS

METHOD OF MAKING BRAKE DRUMS

Application filed October 3, 1930. Serial No. 486,088.

This invention relates to brake drums, and has for its object the provision of a simple manner of inserting a liner of steel or the like in a drum, without the use of special apparatus or machines. The method is applicable to the replacement of such liners in the field, as well as during the original manufacture of the drums, and is of special utility in mounting liners in drums forming structural elements of the wheels, as is now usual in airplane wheels.

Having this object in mind the drum is expanded by pouring into it a quantity of molten alloy such as solder, which thereupon solidifies and at the same time transfers most of its heat to the drum, causing it to expand. The solidified alloy is readily removed from the drum by turning it upside down and allowing it to drop out, whereupon the steel liner is pushed into the expanded drum, which shrinks tightly upon the liner as the drum cools.

The above and other advantages of the invention will be apparent from the following description of the accompanying drawing, in which.

Figure 1:
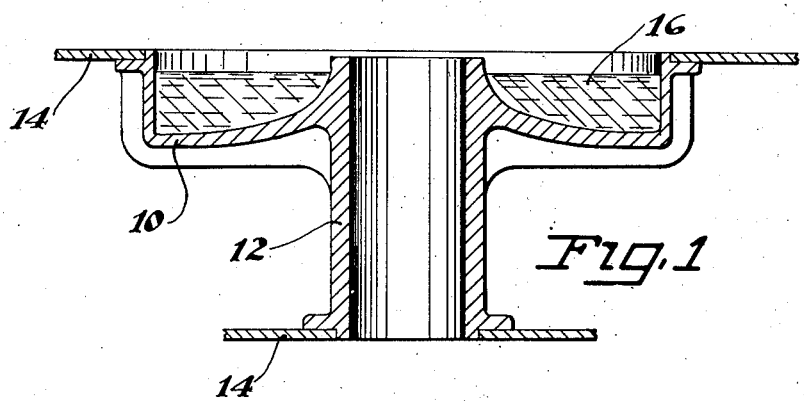
Figure 1 is a diametrical section through the drum containing the molten alloy.
Figure 2:
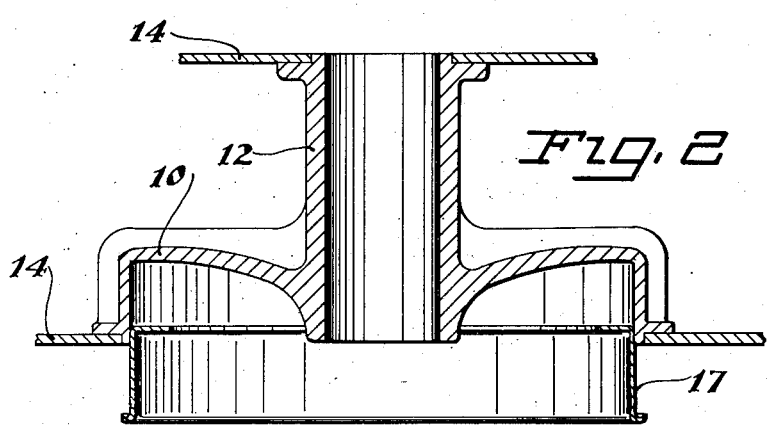
Figure 2 is a similar section showing the insertion of the liner.
Figure 3:
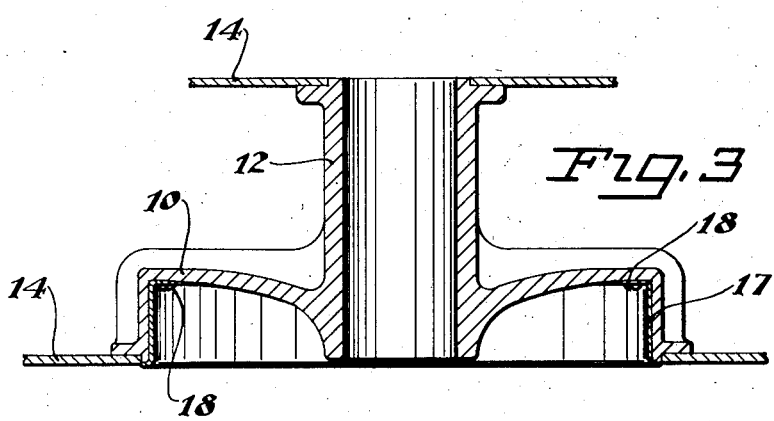
Figure 3 is a similar section through the completed drum.

In the arrangement illustrated, the drum 10 and wheel hub 12 are formed as one integral casting of duraluminum or the like, and after the necessary machining is assembled with disks 14, etc., to form an airplane wheel as more fully explained in Patent No. 1,659,365 granted Bendix Brake Company on February 14, 1928, on application of I. M. Laddon et al.

According to the present invention, the drum is expanded by pouring into it a quantity of molten alloy such as solder 16, which solidifies quickly and at the same time transfers its heat to the drum. The solidified button of solder is readily dumped out of the drum, whereupon a steel liner 17 is pressed into the drum and the drum allowed to shrink tightly upon it as the drum cools. The liner 17 may additionally be secured to the drum by means such as screws or other fastenings 18, if desired.

While one particular method and one particular structure have been described in detail, it is not my intention to limit the scope of the invention by the foregoing description, or otherwise than by the terms of the appended claims.

I claim:

1. That method of inserting a liner in a brake drum which comprises pouring a melted alloy into the drum and allowing it to solidify, removing the solidified alloy, and inserting the liner and allowing the drum to shrink thereon as it cools.

2. A method of mounting a liner in a brake drum, comprising pouring a melted alloy of low melting point into the drum, allowing the alloy to transfer heat to the drum to expand it, removing the alloy, inserting the liner, and allowing the drum to shrink thereon as it cools.

In testimony whereof, I have hereunto signed my name.

JOHN R. CAUTLEY.